(12) United States Patent
Schaal et al.

(10) Patent No.: US 11,679,645 B2
(45) Date of Patent: Jun. 20, 2023

(54) CONTROL MECHANISM FOR A KINEMATIC SYSTEM IN A PASSENGER COMPARTMENT

(71) Applicant: fischer automotive systems GmbH & Co. KG, Horb a.N. (DE)

(72) Inventors: Falk Schaal, Loßburg (DE); Ulrich Suchy, Freudenstadt (DE)

(73) Assignee: fischer automotive systems GmbH & Co. KG, Horb a.N. (DE)

( * ) Notice: Subject to any disclaimer, the term of this patent is extended or adjusted under 35 U.S.C. 154(b) by 88 days.

(21) Appl. No.: 17/485,470

(22) Filed: Sep. 26, 2021

(65) Prior Publication Data
US 2022/0097483 A1   Mar. 31, 2022

(30) Foreign Application Priority Data

Sep. 29, 2020 (DE) ...................... 10 2020 125 327.3
Jul. 27, 2021 (DE) ...................... 10 2021 119 416.4

(51) Int. Cl.
*B60H 1/00*    (2006.01)
(52) U.S. Cl.
CPC ................................ *B60H 1/00671* (2013.01)
(58) Field of Classification Search
CPC ............ B60H 1/00671; B60H 1/00857; B60H 1/00835; Y10T 137/87732; Y10T 137/87475
USPC .................................................... 454/69–165
See application file for complete search history.

(56) References Cited

U.S. PATENT DOCUMENTS

| | | | |
|---|---|---|---|
| 11,560,044 B2 * | 1/2023 | Käfer | B60H 1/3428 |
| 2012/0184197 A1 * | 7/2012 | Mayer | B60H 1/00857 |
| | | | 454/155 |
| 2021/0018213 A1 | 1/2021 | Wan et al. | |

FOREIGN PATENT DOCUMENTS

| | | |
|---|---|---|
| CN | 110962548 A | 4/2020 |
| CN | 111169255 A | 5/2020 |
| DE | 199 28 834 A1 | 12/2000 |
| DE | 10 2015 101 101 B3 | 7/2016 |
| DE | 10 2020 114 891 A1 | 1/2021 |
| EP | 3628891 A1 | 4/2020 |
| WO | 2020/172098 A1 | 8/2020 |

OTHER PUBLICATIONS

German Search Report for corresponding Application No. 10 2020 125 327.3, dated Nov. 23, 2020.

* cited by examiner

*Primary Examiner* — Ko-Wei Lin
(74) *Attorney, Agent, or Firm* — Renner, Otto, Boisselle & Sklar, LLP

(57) ABSTRACT

A control mechanism for controlling a plurality of movable elements of a ventilation nozzle using only one drive. The control mechanism includes a base body, a control gate, and at least two driven elements. A sliding block element having two degrees of freedom with respect to the base body is guided by alternating movements in two opposite directions of the first degree of freedom by the control gate and, in the process, consecutively abuts the first and/or second driven elements. So as to design such a control mechanism as simply as possible, rotational movements are utilized, instead of translatory movements.

16 Claims, 9 Drawing Sheets

CONTROL MECHANISM FOR A KINEMATIC SYSTEM IN A PASSENGER COMPARTMENT

This application claims priority under 35 USC § 119 to German Patent Application Nos. 10 2020 125 327.3 and 10 2021 119 416.4, filed on Sep. 29, 2020 and Jul. 27, 2021, respectively, the entire disclosures of which are incorporated herein by reference.

TECHNICAL FIELD OF THE INVENTION

The invention relates to a control mechanism for a kinematic system in a passenger compartment.

DISCUSSION OF THE RELATED ART

A control mechanism for independently adjusting blades of two vents using only one motor is known from the prior art publication DE 10 2015 101 101 B3. The core of the control mechanism is a control gate through which a sliding block element including a spring-loaded pin passes. For this purpose, the sliding block element is mounted so as to be movable in two orthogonal directions with respect to the control gate. A spring urges the pin in a first of the two orthogonal directions, while the movement in the second of the two orthogonal directions takes place, by way of two levers, by a motor. By way of different directions of rotation of the motor, a back and forth movement can thus be generated in the second direction. The control gate not only predefines a kind of loop of the control block, but in the region of a meander-shaped segment also enables branching into straight side segments, which can also be interpreted as dead ends. The motor movement determines whether or not the pin is moved into a side segment, wherein the pin moves out of the side segment in the exact same manner as it moves in. Adjusting members of displacement elements, which can be displaced by the pin through contact, protrude into the side segments. Two oppositely oriented side segments in each case are used to displace a displacement element in opposite directions since the displacement element protrudes with a respective adjusting member into the side segments. A total of four side segments branch off the meander-shaped segment, so that two adjusting members can be controlled. Even though the adjustment can only be carried out consecutively, arbitrary position combinations are possible. The displacement of the adjusting members is transferred to gear wheels by way of a respective toothed rack. The rotational movement thereof is thus converted to adjustment of the blades.

SUMMARY OF THE INVENTION

It is the object of the invention to simplify the known control mechanism.

The invention provides a control mechanism for a kinematic system in a passenger compartment, in particular for controlling movable elements of a ventilation nozzle. The movable elements can be blades for controlling the direction of an exiting air current or, for example, a metering flap for controlling the amount of air current that exits. The movable elements can also belong to two different ventilation nozzles. Another example of a kinematic system is a display that is adjustable about two axes. In addition, the target of control could be a further movement, such as that of a closing cover. "Passenger compartment" here denotes the cabin of a wide variety of vehicles, such as cars, trains, or airplanes.

The control mechanism includes a base body, which can form a housing, for example. The base body can also be part of another element, which is to say, for example, designed in one piece with a housing part of a ventilation nozzle. The control mechanism furthermore includes an, in particular electromotive, drive and at least two driven elements, which is to say a first driven element and a second driven element. The electromotive drive can be a stepper motor or an electric motor including a Hall sensor, for example. The driven elements are movably mounted with respect to the base body, wherein the mount does not have to be arranged directly at the base body, but can also be made by way of other components. The mount can be translatory and/or rotatory, which is to say, in particular, allow a pushing motion or a rotational motion of the driven elements with respect to the base body. The driven elements are in particular separate components, and are not coupled in terms of the movement thereof.

A movement of the drive is converted into a targeted movement of the driven elements by the control mechanism. The driven elements can be coupled to further gear elements or directly to the element to be adjusted, for example a blade.

The control mechanism furthermore includes a control element including a control gate. A "control gate" shall be understood to mean a contour including a radial cam. The control gate is formed by a slot, a web, or a groove, for example. The control element can be designed as a separate component, in particular when it is movable with respect to other elements, will be explained in more detail below. However, the control element can also be integral with other components, in particular with the base body, when movability is not required.

The control gate cooperates with a sliding block, which is part of a sliding block element. The term "sliding block" shall be understood in the functional sense here, this being an element that moves along the control gate and is in contact therewith. The sliding block is thus guided by the control gate. In the case where a slot or a groove serves as the control gate, the sliding block in particular has the shape of a pin or a tenon, and in the case where a web serves as the control gate, the sliding block can, for example, have the shape of two pins, which abut the web on both sides.

The sliding block element is mounted with a first and a second degree of freedom with respect to the base body, with more degrees of freedom being possible, but not preferred. The sliding block element is in particular mounted directly to the base body. However, it is also possible for one or more components to be interposed.

The sliding block element is in particular rigid, and in particular designed in one piece. However, it can also be movable, for example when the control gate includes a three-dimensional radial cam. In this way, or as a result of an appropriate mount, the sliding block element can have another degree of freedom with respect to the base body.

The control gate, however, preferably includes a two-dimensional radial cam.

The sliding block element includes one or more entrainment surfaces. The entrainment surface can be made to consecutively abut the first and second driven elements, and more particularly through alternating movements of the sliding block in two opposite directions of the first degree of freedom relative to the control element. For this purpose, the driven elements in particular comprise abutment surfaces for the entrainment surface, and more particularly in particular a respective pair of abutment surfaces per driven element, wherein the two abutment surfaces of a pair are used for the adjustment in opposite directions. For the purpose of simplification, an entrainment surface of the sliding block element will always be mentioned hereafter, even if geometrically different surfaces may be distinguishable or, in any case, different points of the entrainment surface ultimately abut the abutment surfaces. In particular, an arched surface that forms the entrainment surface is conceivable. "Consecutively abut" shall be understood to mean that the entrainment surface cannot be made to simultaneously abut the first and second driven elements, but not that this has to occur in a certain order. When the entrainment surface does not abut an abutment surface of a driven element, this driven element does not move, but is held in the most recently set position due to friction, additional retaining elements or the like. This does not have to be implemented by the control mechanism itself. For example, when using the control mechanism for adjusting blades, it is possible that a damping element in the mount of the blades ensures that these, including the driven element coupled thereto, do not shift due to gravity or vibrations. It is also possible that a manual adjustment of the blades can be carried out, by which the driven element is also adjusted. The control mechanism thus makes it possible to combine a motor-driven adjustment with a manual adjustability.

The entrainment surface is preferably separate from the sliding block. In this way, both the entrainment surface and the sliding block can be shaped and dimensioned in such a way that both the entrainment surface and the sliding block are optimized for the particular function.

As mentioned, the sliding block element can be moved relative to the control element. This movement is driven by the drive in that the control element and/or the sliding block element can be moved by the drive, and more particularly in two opposite driving directions. The motor acts directly or indirectly on the control element or the sliding block element.

The design, and in particular the control gate, are such that the driven elements can be adjusted with respect to the base body by way of the sliding block element.

It is characterizing of the invention that the two opposite driving directions are directions of rotation. Due to the rotatory movement, a considerably simpler design is possible than is known from the published prior art DE 10 2015 101 101 B3. In particular, the rotational movement of the motor does not need to be converted into a translatory movement by way of levers. A rotational movement also allows the sliding block to easily pass through the control gate, without a reversal point and without a three-dimensional control gate.

In one embodiment of the invention, the control element can be moved in the two opposite driving directions with respect to the base body, and the driven elements are mounted in a translatory manner with respect to the base body. In particular, the two degrees of freedom of the sliding block element are of a translatory nature in this case. This is in particular advantageous when a translatory adjustment is to be carried out by way of the driven elements, since no conversion into a rotational movement is necessary.

As mentioned, the control element and/or the sliding block element can be moved by the drive. When the drive is to act on the control element, which is to say the control gate is moved, the control mechanism has the degree of freedom of the control element, in addition to the two degrees of freedom of the sliding block element. This can give rise to the problem that the sliding block is not forcibly guided by the control gate, but can assume different positions, whereby the control result would not be predictable. The invention thus provides that the sliding block element is urged by at least one first spring element with respect to the first degree of freedom in the direction of a central position, from which it can be moved in the two opposite directions. In this way, it is achieved that the sliding block has a defined position with respect to the control gate. In addition, a second spring element can be provided for achieving a defined position, to urge the sliding block element with respect to the second degree of freedom in one direction.

In a preferred embodiment, the first degree of freedom of the sliding block element is given by a rotatable mount since, in this way, a simple design is favored. In other words, the first degree of freedom is of a rotatory nature, and the sliding block element is rotatably mounted with respect to the base body. If the control element is likewise rotatable with respect to the base body, a particularly simple design results due to a coaxial mounting of the sliding block element and control element.

The driven elements are preferably rotatably mounted, wherein this, in turn, simplifies the design, in particular in combination with a rotatably mounted sliding block element as mentioned above. It also applies to the driven elements that, additionally, the design is simplified when the driven elements are mounted coaxially to the control element, provided the control element is likewise rotatably mounted with respect to the base body.

A particularly simple design results when the control element is rigidly connected to or integral with the base body. In this case, the drive drives the sliding block element, whereby, in particular, the opposite directions of the first degree of freedom are also the two opposite driving directions. The sliding block element is thus only guided with respect to the second degree of freedom by the rigid control gate. In this embodiment, the first spring can thus be dispensed with for urging with respect to the first degree of freedom in the direction of a central position. Another advantage arises from the fact that a flow of force originating from the motor is transmitted to the sliding block element, and from there directly via the entrainment surface to the driven elements. In combination with the aforementioned geometric separation of the entrainment surface and the sliding block, this allows for the flow of force not to run through the sliding block, so that the sliding block can be designed to have an accordingly delicate design.

To ensure an, in particular two-dimensional, control gate that is as simple as possible and a robust function, the invention provides that the control gate includes a spiral section. If the sliding block, during the alternating movements, moves radially inwardly with respect to the driving directions, the sliding block can be moved back again, radially outwardly, by the spiral section. If the sliding block, during the alternating movements, moves radially outwardly, this can be moved back again, radially inwardly, by the spiral section. Instead of a spiral section, tangential sections and/or reversal points are possible. A "reversal point" shall be understood to mean a contour in which movement along the control gate requires a reversal of the driving direction. This, however, may necessitate further measures, such as a three-dimensional design of the control gate, additional spring elements or a special shape of the sliding block and the control gate.

For the alternating movements, the control gate can comprise a meander-shaped section. However, this can result in the production of undesirable noise, in particular in conjunction with the aforementioned second spring element, which, for example, moves the sliding block radially inwardly, when the sliding block strikes against a wall of the control gate, accelerated by the spring. The invention thus provides that the control gate includes a zig-zag section. This makes it possible to configure the control gate so that the second spring element is not even required, and noise is thus eliminated. Even when the second spring element is preserved, the production of noise decreases considerably since the accelerations are lower, resulting in a gentler sequence of movements.

The sliding block element is preferably exclusively moved by the control gate with respect to the second degree of freedom. As a result, the aforementioned second spring element can be dispensed with.

The invention furthermore provides that the control gate includes a first distribution section, from which a respective first circular arc-shaped adjustment section branches off for each driven element. The first adjustment section is used to move the sliding block in the first direction. A driven element can thus be adjusted in accordance with the first direction by moving the sliding block, starting from the distribution section, into the particular adjustment section. The control gate furthermore includes a separate second distribution section, from which a respective second circular arc-shaped adjustment section branches off for each driven element. These adjustment sections are used to adjust the driven elements in accordance with the second direction by moving the sliding block in the second direction. The two distribution sections are in particular substantially parallel and extend adjoining one another. They are in particular connected by connecting sections. The distribution sections extend in particular in a step-shaped manner.

As mentioned, it is preferable that the entrainment surface of the sliding block element is separate from the sliding block thereof. The invention furthermore provides that the sliding block element includes a base body, from which the sliding block projects on a first side, and from which an elevation including the entrainment surface projects on an opposite second side. In this way, the control gate can be arranged on the one side, and the driven elements can be arranged on the other side of the sliding block element. This not only allows for a simple design, but also allows the driving forces of the drive to be introduced onto the base body, and from there only onto the side of the entrainment surface, whereby the sliding block remains without load.

The invention provides that a cavity is arranged between the sliding block element and the driven elements, into which the entrainment surface of the sliding block element and abutment surfaces of the driven elements protrude. As a result of the cavity, potential undesirable collisions between the components are avoided. The cavity is used to ensure that the entrainment surface is able to move freely relative to the driven elements and only ends up abutting these when this is desirable and predefined by the control gate.

The invention furthermore provides that the sliding block does not have a circular cross-section, but a polygonal cross-section. In this way, the movement of the sliding block along the control gate can be drastically influenced, as a result of which, for example, the aforementioned second spring element can be dispensed with. In addition, a considerably more compact design becomes possible.

The features and feature combinations, embodiments and configurations of the invention mentioned above in the description, and the features and feature combinations mentioned hereafter in the description of the figures and/or shown in a figure, can be used not only in the respective indicated or illustrated combination, but also in other essentially arbitrary combinations, or alone. Embodiments of the invention that do not include all the features of a dependent claim are possible. It is also possible to replace individual features of a claim with other disclosed features or feature combinations. Embodiments of the invention that do not include all the features of the exemplary embodiment or exemplary embodiments, but an essentially arbitrary portion of the characterizing features of one exemplary embodiment, optionally in combination with one, more or all the features of one or more further exemplary embodiments, are possible.

BRIEF DESCRIPTION OF THE DRAWINGS

The invention will be described hereafter based on four exemplary embodiments. Identical reference numerals are used for components having identical or similar functions, even if the components differ slightly from one another. The figures are essentially true to scale.

In the drawings.

DETAILED DESCRIPTION OF THE INVENTION

Figure 1A:
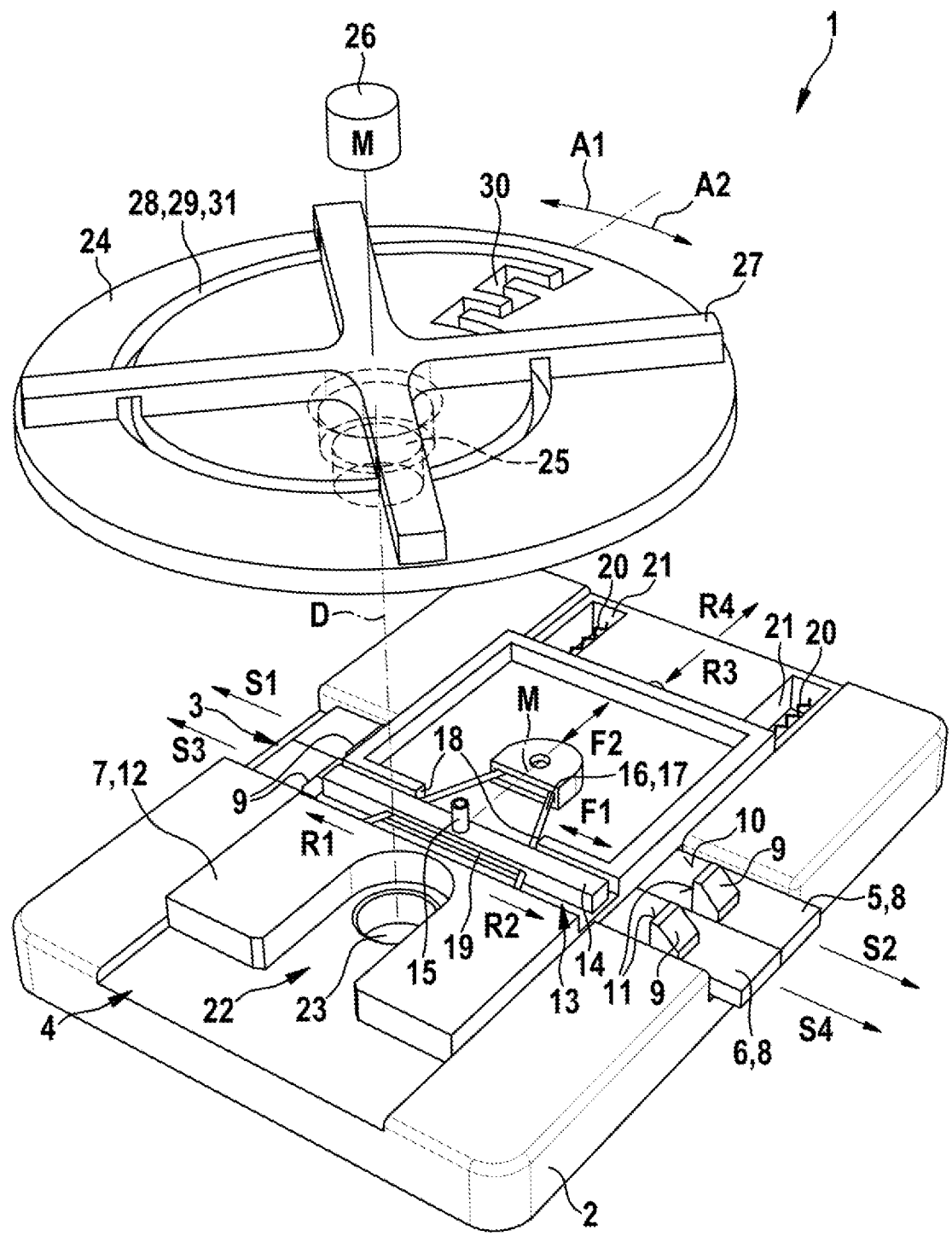
FIG. 1A shows a first exemplary embodiment in a (partially) exploded view in a perspective illustration.

The first exemplary embodiment illustrated in FIGS. 1A-1F shows a control mechanism 1 according to the invention, in which a rotatory movement is combined with multiple translatory movements.

The control mechanism 1 includes a plate-shaped base body 2 having a rectangular footprint. On an upper side, the base body 2 includes a deeper groove 3 and a flatter groove 4, which intersect at a right angle. The deeper groove 3 is used to mount a first driven element 5 and a second driven element 6 in a translatory manner, while the flatter groove 4 is used to mount a carriage 7 in a translatory manner.

Each of the two driven elements 5, 6 includes a flat, slat-shaped base body 8. The base bodies 8 are arranged parallel to one another in the deeper groove 3 and are mounted thereby. The base bodies are so flat that these are able to pass underneath the carriage 7. At the ends, the driven elements 5, 6 comprise respective abutment elevations 9 which protrude beyond an upper side 10 of the base body 2. The two abutment elevations 9 of a driven element 5, 6 are offset transversely with respect to the four possible displacement directions S1, S2, S3, S4 of the driven elements 5, 6 and each form abutment surfaces 11 facing one another. In FIG. 1A, the two driven elements 5, 6 are displaced in the displacement directions S2 and S4, which is why two of the four abutment elevations 9 are hidden by the carriage 7.

The carriage 7 includes a plate-shaped, substantially rectangular carriage base body 12. A sliding block element 14 is mounted in a translatory manner in a guide groove 13 of the carriage base body 12, and more particularly displaceably in parallel to the displacement directions S1, S2, S3, S4 of the driven elements 5, 6. In this way, a first degree of freedom F1 is provided for the sliding block element 14, and the sliding block element 14 can be moved in a first direction R1 and an opposite second direction R2, which can be interpreted as opposite directions R1, R2 of the first degree of freedom F1. Together with the carriage base body 12, the sliding block element 14 can additionally be moved transversely to the displacement directions S1, S2, S3, S4 of the driven elements 5, 6 in a third direction R3 and an opposite fourth direction R4, whereby the sliding block element 14 has a second degree of freedom F2. The sliding block element 14 is elongated and beam-shaped. A sliding block 15 in the form of a cylindrical tenon projects centrally with respect to the longitudinal extension. A first spring element 16 in the form of a torsion spring 17 urges the sliding block element 14 in the direction of a central position M. In the illustrated central position M, for this purpose, the two legs of the torsion spring 17 abut abutment points 18 of the carriage base body 12 in a preloaded manner, and additionally pass through a longitudinal slot 19 of the sliding block element 14. When the sliding block element 14 is moved in the first direction R1, for example, the one leg of the torsion spring 17 is pushed by the end of the longitudinal slot 19, however the other leg of the torsion spring 17, which continues to abut the opposite abutment point 18, counteracts this movement. Two second spring elements 20 are arranged in two further grooves 21 in the base body 2 and urge the carriage 7 in the third direction R3, for which purpose the carriage base body 12 protrudes with abutment blocks into the further grooves 21 (hidden and therefore not shown). The further grooves 21 are arranged in parallel and inside the flatter groove 4. On a side facing away from the second spring elements 20, the carriage base body 12 includes a U-shaped recess 22, so that the carriage 7 does not hide a borehole 23 in the base body 2, regardless of the position of the carriage 7.

A rotary table-shaped control element 24 protrudes into the borehole 23 with a cylindrical bearing tenon 25, by way of which the control element 24 is rotatably mounted about an axis of rotation D with respect to the base body 2. The control element 24 is driven on a side opposite the bearing tenon 25 by way of an electric motor, serving as the drive 26. This is only shown symbolically in FIG. 1, since the exact mechanical coupling of the drive 26 to the control element 24 is not relevant in this context. The drive 26 can drive the control element 24 in a first driving direction A1 and an opposite second driving direction A2, wherein the two driving directions A1, A2 are directions of rotation. Likewise on the side of the drive 26, the control element 24 includes a cross-shaped reinforcement rib 27. A control gate 28, in the form of a slot 29 extending through the control element 24, extends in a radial plane perpendicular to the axis of rotation D. The control gate 28 can also be interpreted as a radial cam. The control gate 28 includes a meander section, which extends radially and extends around a spiral section 31, which connects the two ends of the meander section 30, and thus around the axis of rotation D. The sliding block 15 engages in the control gate 28.

Figure 1B:
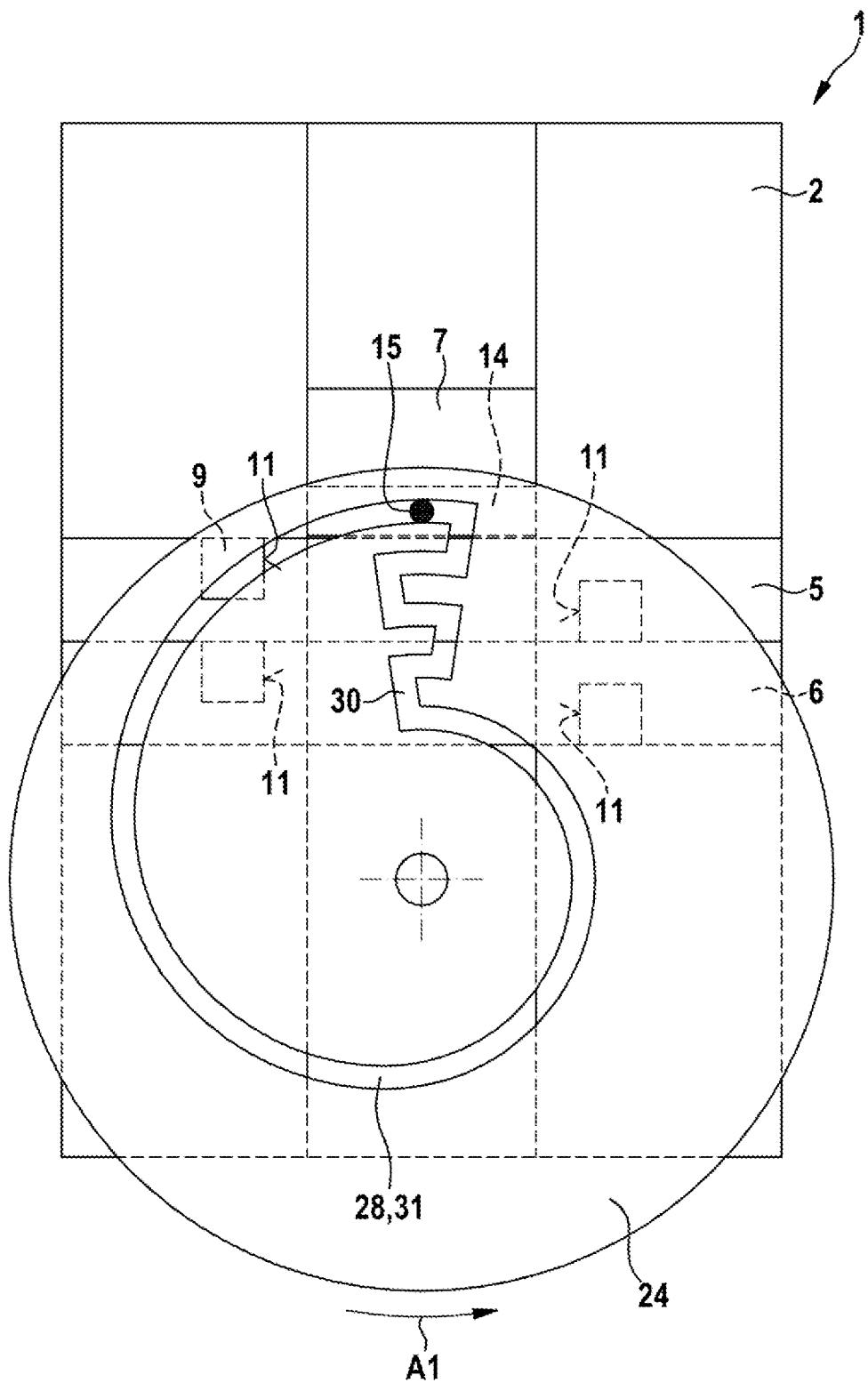
FIGS. 1B to 1F show the first exemplary embodiment in different control positions.
Figure 1C:
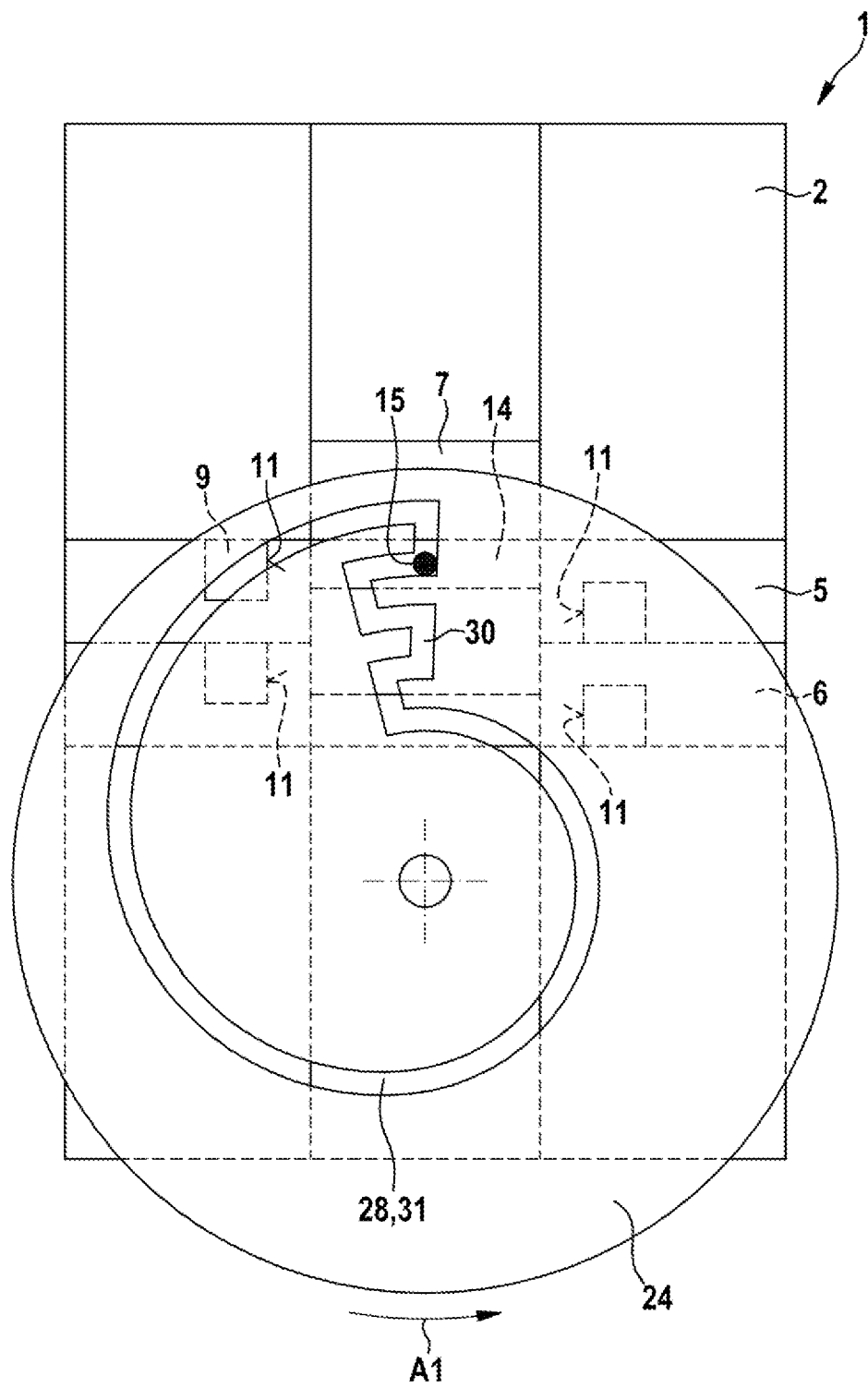
Figure 1D:
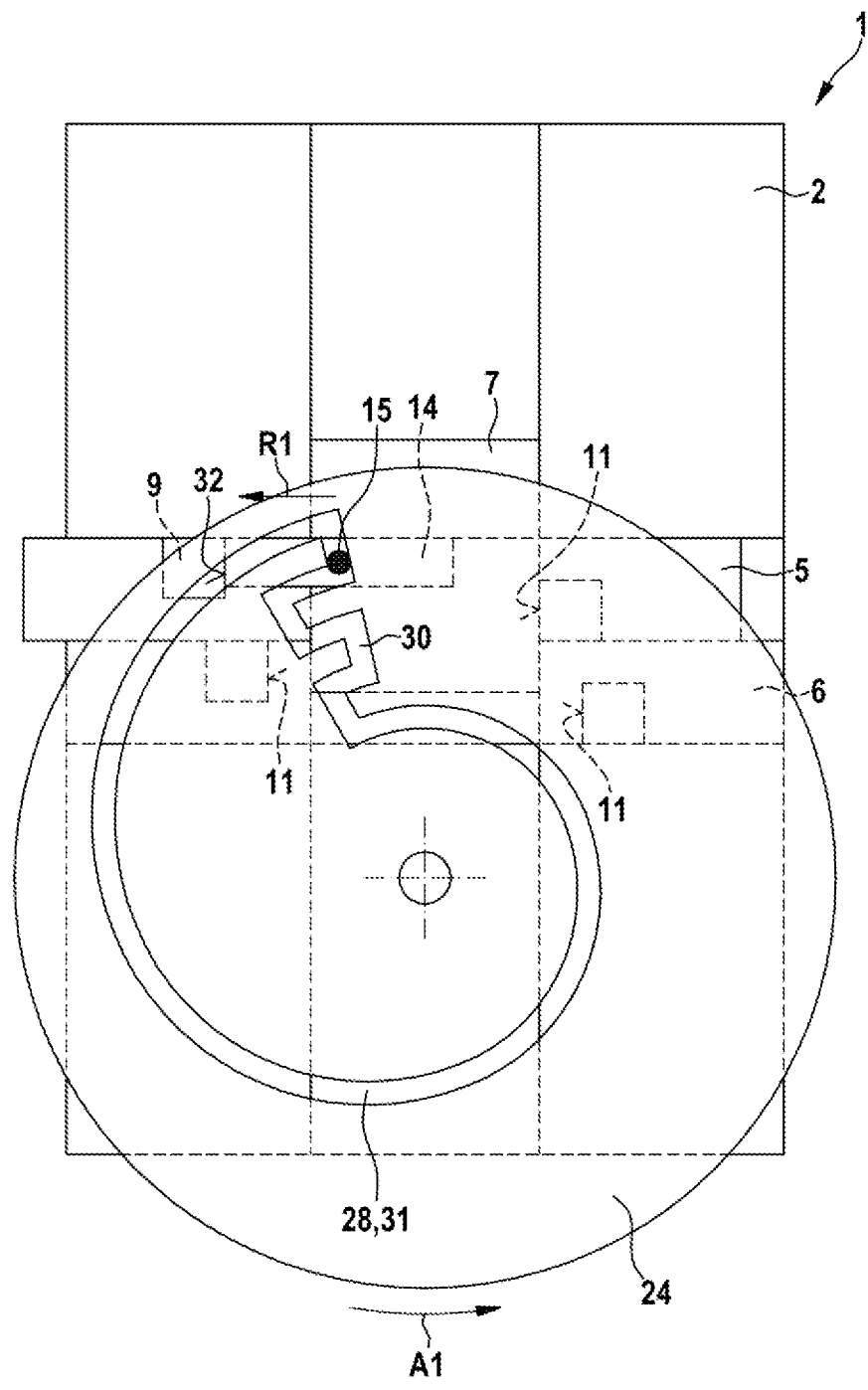
Figure 1E:
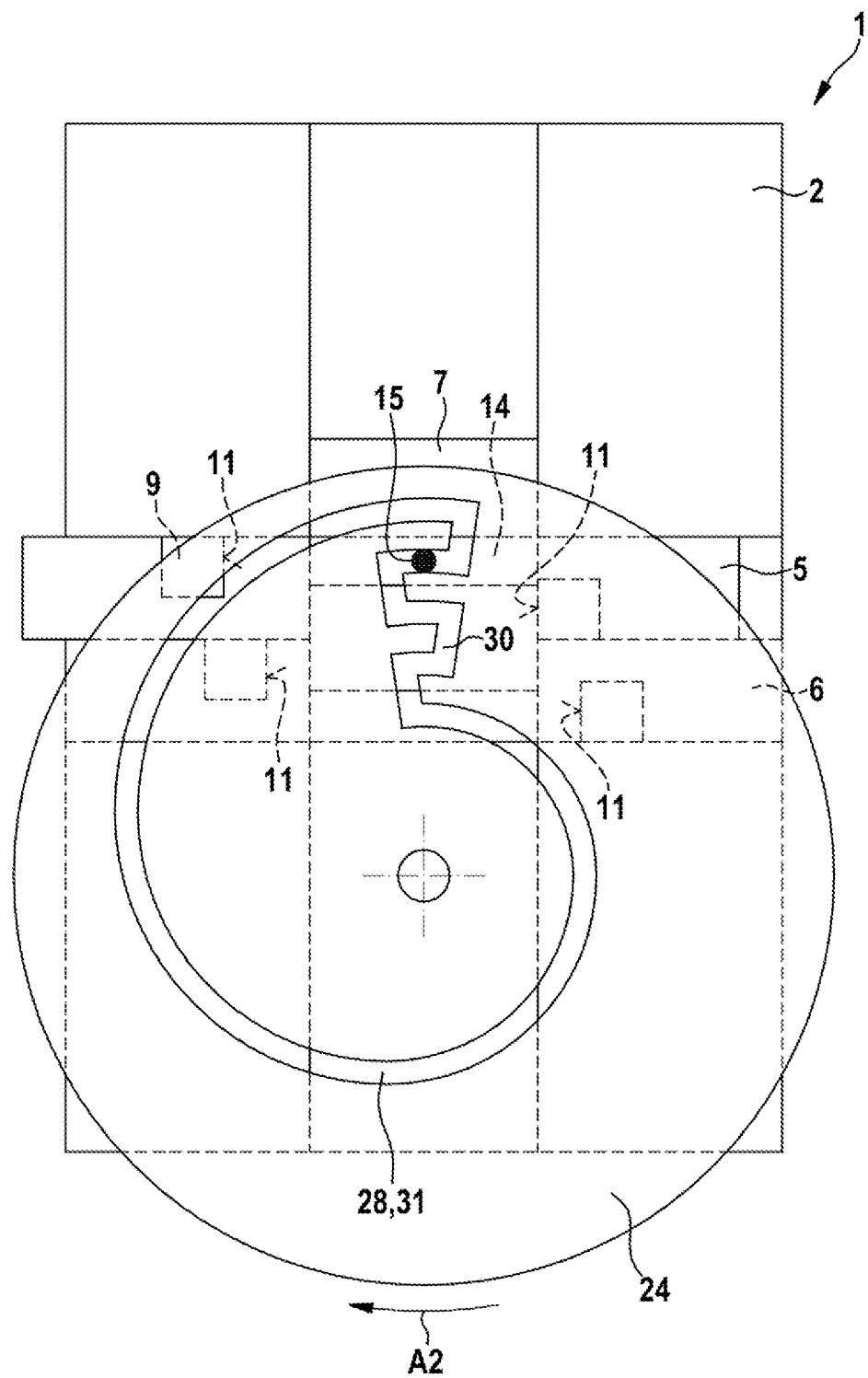
Figure 1F:
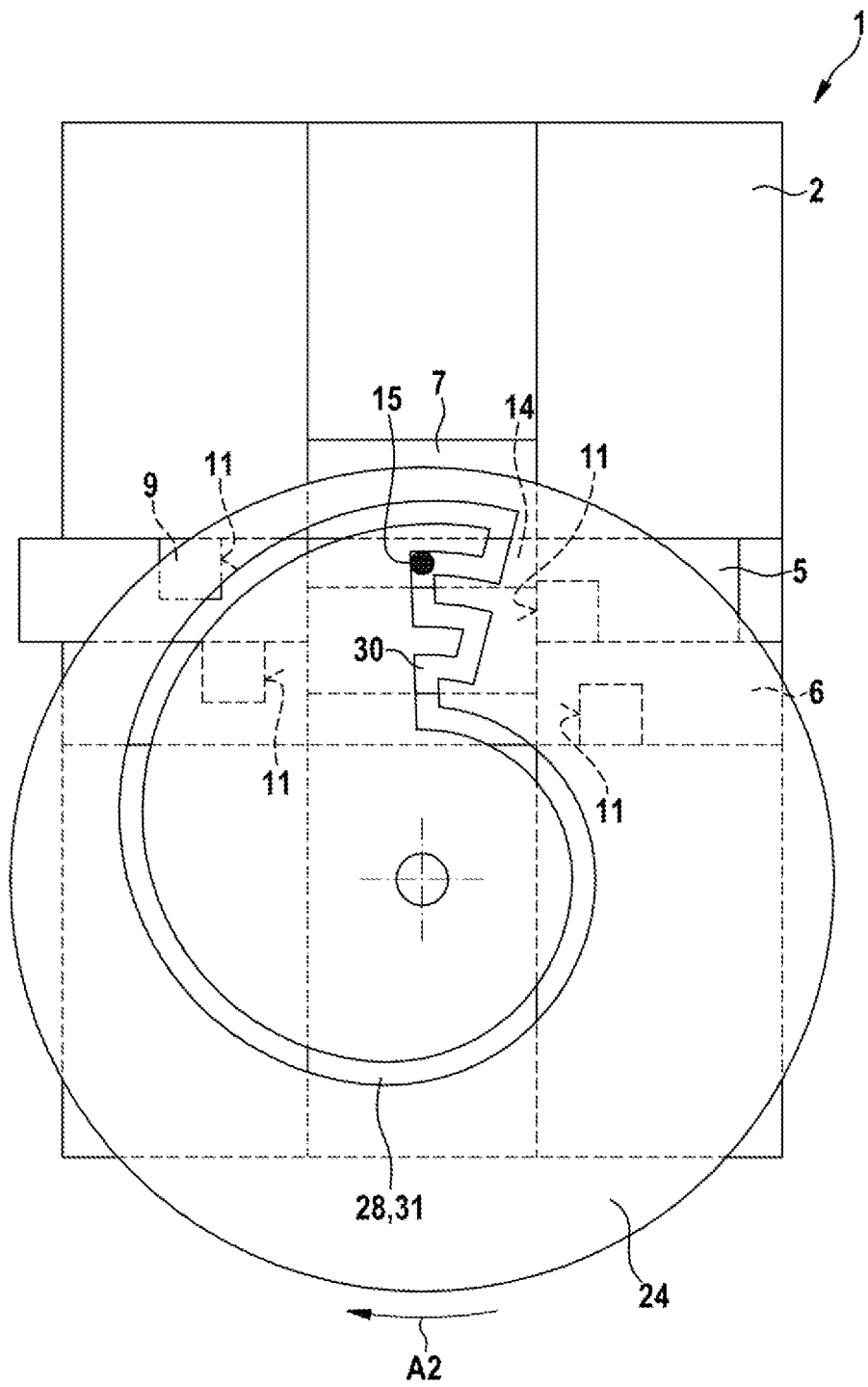

The function will be described hereafter based on a possible control procedure, which is shown in FIGS. 1B-1F. The control procedure provides that the first driven element 5 is to be displaced in the first displacement direction S1. The components of the control mechanism 1 are each illustrated in slightly simplified form for the sake of clarity. The terms "radial" and "in the circumferential direction" used hereafter always refer to the axis of rotation D. In FIG. 1B, the sliding block 15 is located in the spiral section 31 of the control gate 28, and more particularly very close to the meander section 30. This position can be interpreted as a waiting position. Proceeding from this, the control element 24 is rotated in the first driving direction A1, whereby the sliding block 15 reaches the meander section 30 and, as a result of the second spring element 20, radially reaches the position shown in FIG. 10. The sliding block 15 abuts a corner of the meander section 30 on one side, both radially and in the circumferential direction. As a result of a further rotation of the control element 24 in the first driving direction A1, the abutment in the circumferential direction causes the sliding block 15 to be displaced in the first direction R1, as is shown in FIG. 1D. With an end face, which acts as an entrainment surface 32, the sliding block element 14 thus ultimately abuts of one of the abutment surfaces 11 of the first driven element 5 and causes a displacement of the first driven element 5 in the first shift direction S1. The first driven element 5 can, for example, be connected to the vertical blades, so that these are adjusted. Thereafter, the control element 24 is rotated in the second driving direction A2. As a result of the first spring element 16, the sliding block 15 is moved back into the central position M. Initially, the sliding block 15 still abuts in the circumferential direction, but then comes clear in the circumferential direction and reaches a circumferential section of the meander section 30, as is shown in FIG. 1E. In this phase, the position of the sliding block 15 in the circumferential direction is thus not determined by the control gate 28, but by the first spring element 16. The position of the sliding block 15 shown in FIG. 1F is achieved by further rotation in the second driving direction A2. As a result of the second spring element 20, however, a radial movement to the inside takes place immediately, until the sliding block 15 abuts another corner of the meander section 30 (not shown). By way of further alternating rotations in the first and second driving directions A1, A2, the sliding block 15 is initially moved back into the waiting position, first by the remaining meander section 30, and then by the spiral section 31, against the force of the second spring element 20. From here, a new control procedure can be started. Of course, it is also possible to adjust both driven elements 5, 6.

Figure 2:
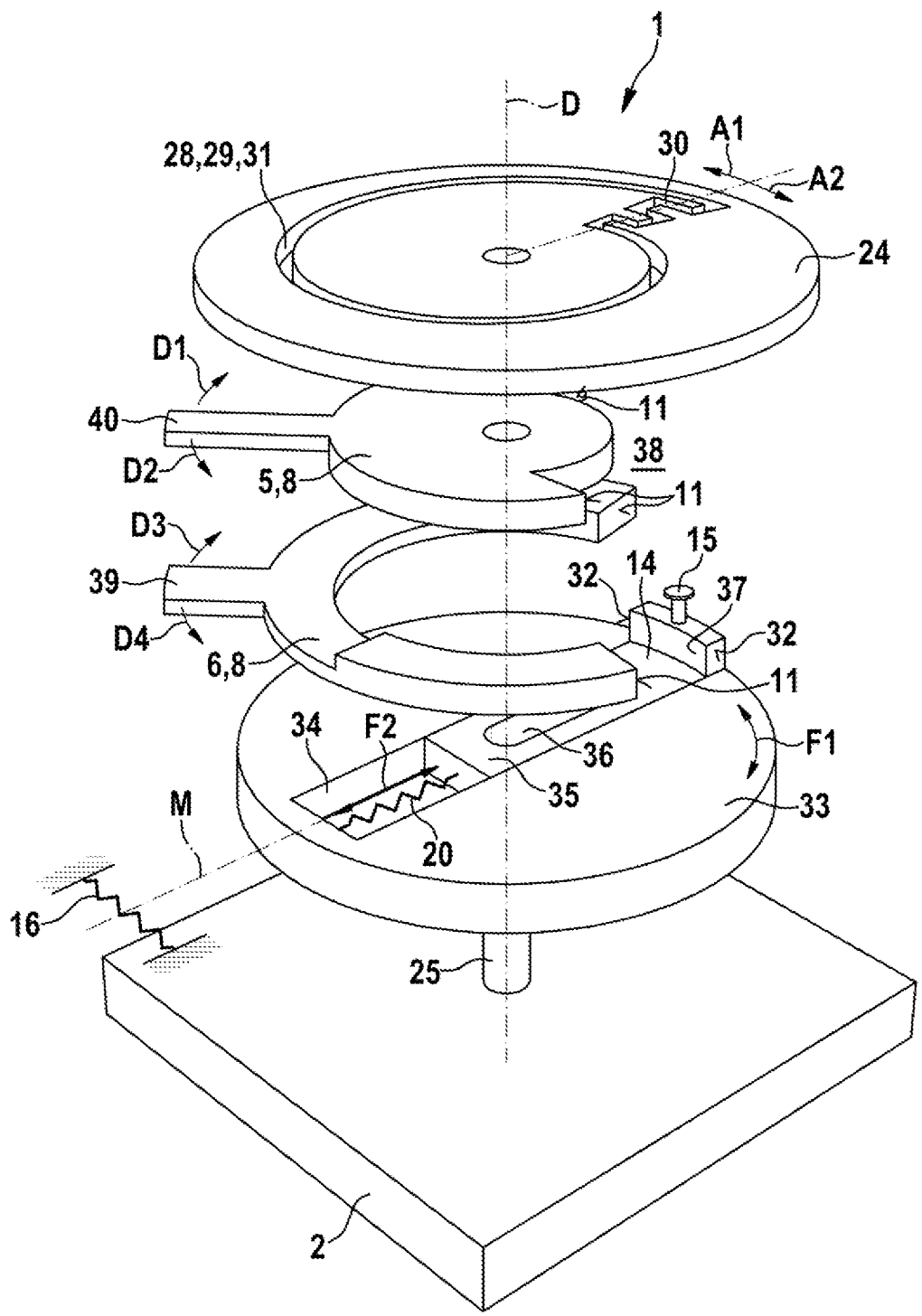
FIG. 2 shows a second exemplary embodiment in a (partially) exploded view in a perspective illustration.

The second exemplary embodiment shown in FIG. 2 is largely consistent with the first exemplary embodiment. To avoid repetition, hereafter, the differences will therefore be addressed in particular. These result in particular from the fact that the two driven elements 5, 6 are not mounted in a translatory manner, but in a rotatory manner, and the first degree of freedom F1 of the sliding block element 14 is also of a rotatory nature.

The base plate 2 is cuboid, including a projecting bearing tenon 25 that defines the axis of rotation D. This bearing tenon 25 is used for mounting a carrier wheel 33 including a groove-like, radially extending pocket 34 for mounting the sliding block element 14, which is thereby mounted radially with the first degree of freedom F1 thereof, and in the circumferential direction with the second degree of freedom F2 thereof. The sliding block element 14 includes a long, flat, cuboid guide body 35, which is accommodated by the pocket 34. The guide body 35 includes an elongated hole 36, through which the bearing tenon 25 protrudes. At an end lying furthest from the axis of rotation D, a block-like elevation 37 protrudes parallel to the axis of rotation D, which at two end faces forms a respective entrainment surface 32 pointing in the circumferential direction. From the elevation 37, a cylindrical sliding block 15 additionally projects parallel to the axis of rotation D.

On the side of the carrier wheel 33 facing away from the base plate 2, the first driven element 5 is mounted on the bearing tenon 25. The base body 8 of the first driven element 5 is circular disk-shaped, including a quarter-ring recess 38 at the circumference, whereby radial abutment surfaces 11 are formed. Opposite the recess 38, a first lever 39 projects from the base body 8 of the first driven element 5 in the radial direction. This first lever 39 can be used to adjust an air guide element (not shown). The circumference of the base body 8 of the first driven element 5 is used to mount the base body 8 of the second driven element 6. The base body 8 of the second driven element 6 has the shape of an open, flat three-quarter ring, wherein the opening again forms radial abutment surfaces 11. Opposite these abutment surfaces 11, a second lever 40 projects from the base body 8 of the second driven element 6, which can be used to adjust another air guide element (not shown). The two driven elements 5, 6 thus each have two directions of rotation D1, D2, D3, D4.

On the side of the driven elements 5, 6 facing away from the carrier wheel 33, the control element 24 is mounted on the bearing tenon 25. The control element 24, the driven elements 5, 6, and the carrier wheel 33 are thus coaxially rotatably mounted. Except for the mount, the control element 24 of the second exemplary embodiment has the same design as in the first exemplary embodiment. The sliding block 15 again protrudes into the control gate 28. The first and second spring elements 16, 20 are only shown symbolically. The first spring element 16 urges the carrier wheel 33 toward a central position M, while the second spring element 20 acts radially inwardly on the guide body 35 within the meaning of a movement of the sliding block 15.

A control procedure in the second exemplary embodiment takes place in a manner similar to that in the first exemplary embodiment.

Figure 3:
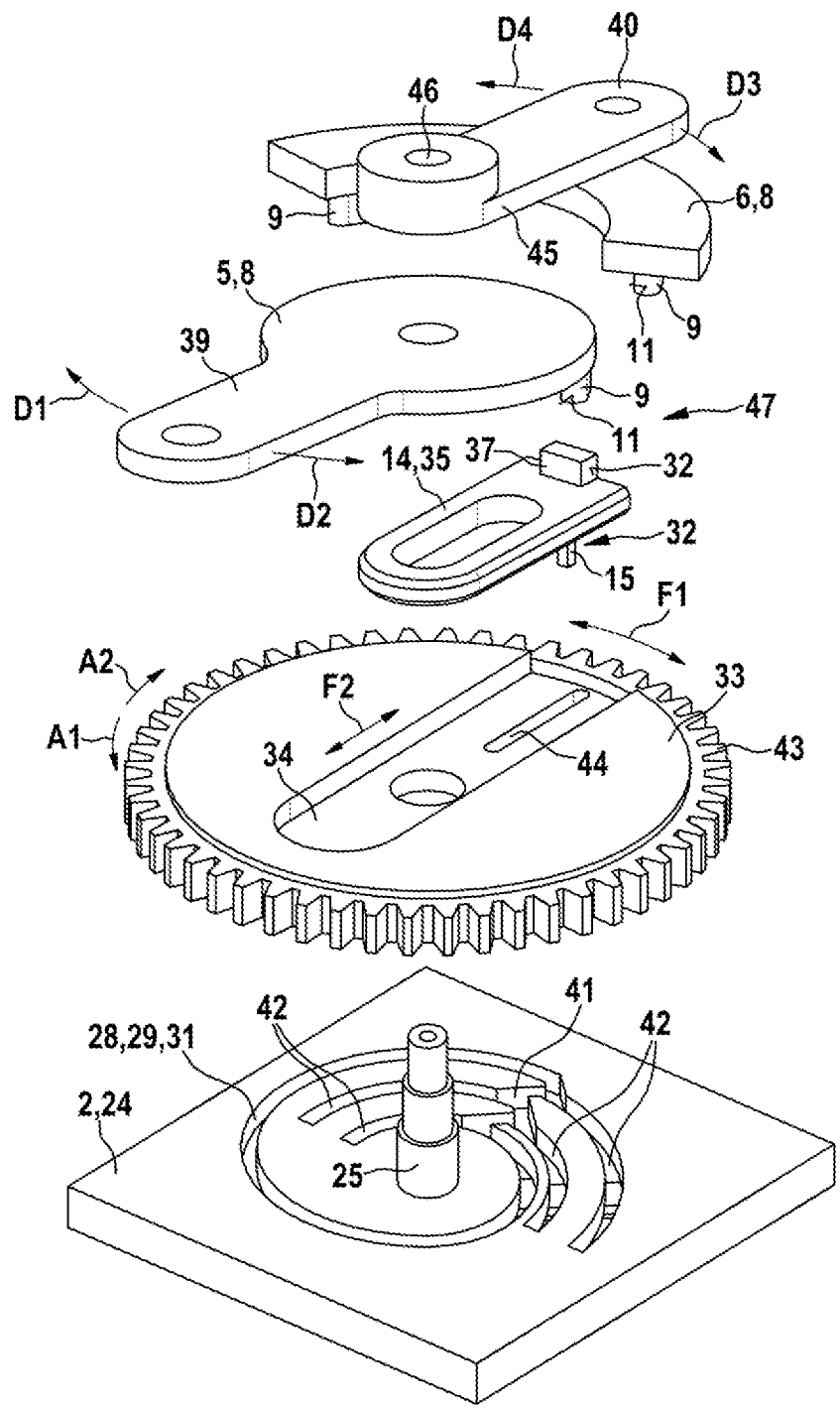
FIG. 3 shows a third exemplary embodiment in a (partially) exploded view in a perspective illustration.

The third exemplary embodiment shown in FIG. 3 again has several commonalities with the second exemplary embodiment, wherein essential differences arise from the driving being carried out by way of the carrier wheel 33, and the control gate 28 being introduced in the base body 2. The base body 2 is thus also the control element 24. Deviating from the base body 2 of the second exemplary embodiment, the control gate 28 extends around the bearing tenon 25. Even though this, again, includes a spiral section 31, the meander section is replaced by a zig-zag section 41. Starting from the corners of the zig-zag section 41, curved grooves 42 extend across approximately 90° in the circumferential direction, and more particularly, two curved grooves 42 each in opposite circumferential directions.

The carrier wheel 33 includes teeth 43 at the outer circumference thereof, which can be driven by a motor, which is not shown. Deviating from the second exemplary embodiment, the pocket 34 includes a radially arranged longitudinal breakthrough 44, through which the sliding block 15 of the sliding block element 14 protrudes. This also results in a difference for the sliding block element 14 compared to the second exemplary embodiment. While the guide body 35 and the elevation 37 including the entrainment surface 32 are designed to be substantially identical, the sliding block 15 does not project from the elevation 37, but from the guide body 35 of the sliding block element 14 on the opposite side. In addition, the sliding block 15 is not cylindrical, but has a rhombic, which is to say polygonal, cross-section. The third exemplary embodiment does not comprise any spring elements, which considerably simplifies the design. Rotating the carrier wheel 33 always yields a defined position of the sliding block 15 inside the control gate 28, the rhombic cross-section of the sliding block 15 not being mandatory, but can facilitate guidance along the control gate 28. The first driven element 5 differs from the second exemplary embodiment in the configuration of the entrainment surfaces 11. Instead of a recess 38, the base body 8 of the first driven element 5 includes two abutment elevations 9 which point toward the carrier wheel 33 and which resemble those of the first exemplary embodiment. Opposite the abutment elevations 9, the first lever 39 projects from the base body 8 of the first driven element 5. The base body 8 of the second driven element 6 has the shape of an open, flat semicircular ring, at the end of which two abutment elevations 9 pointing toward the carrier wheel 33 are arranged. On sides facing one another in a longitudinal direction, the abutment elevations 9 form the abutment surfaces 11 of the driven elements 5, 6. The second lever 40 again projects from the base body 8 of the second driven element 6 radially to the outside. In a radial extension of the lever 40 toward the inside, the base body 8 of the second driven element 6 forms an arm 45 including a bearing borehole 46 for mounting on the bearing tenon 25. The base bodies 8 of the two driven elements 5, 6 are mounted on the bearing tenon 25 so as to be spaced apart from the guide body 35 of the sliding block element 14. In this way, a cavity 47 is arranged between the sliding block element 14 and the driven elements 5, 6, into which the elevation 37, with the entrainment surfaces 32 thereof, and the abutment surfaces 11 of the driven elements 5, 6 protrude. As a result of the cavity 47, the elevation 37 can only make contact with the abutment elevations 9, whereby undesirable collisions are avoided, in particular when passing through the spiral section 31.

To adjust the rotational position of the driven elements 5, 6, the sliding block 15 is guided radially inwardly by alternating movements of the carrier wheel 33 in the two driving directions A1, A2 within the zig-zag section 41, and from the corners of the zig-zag section 41 into the respective matching curved groove 42. For adjusting the second driven element 6 in the direction of rotation D3 (which is to say, looking clockwise at the base body 2 therebeneath), for example, the sliding block 15 is guided into the radially outermost curved groove 42. The entrainment surface 32 thus ultimately abuts a corresponding abutment surface 11 of the second driven element 6.

Figure 4:
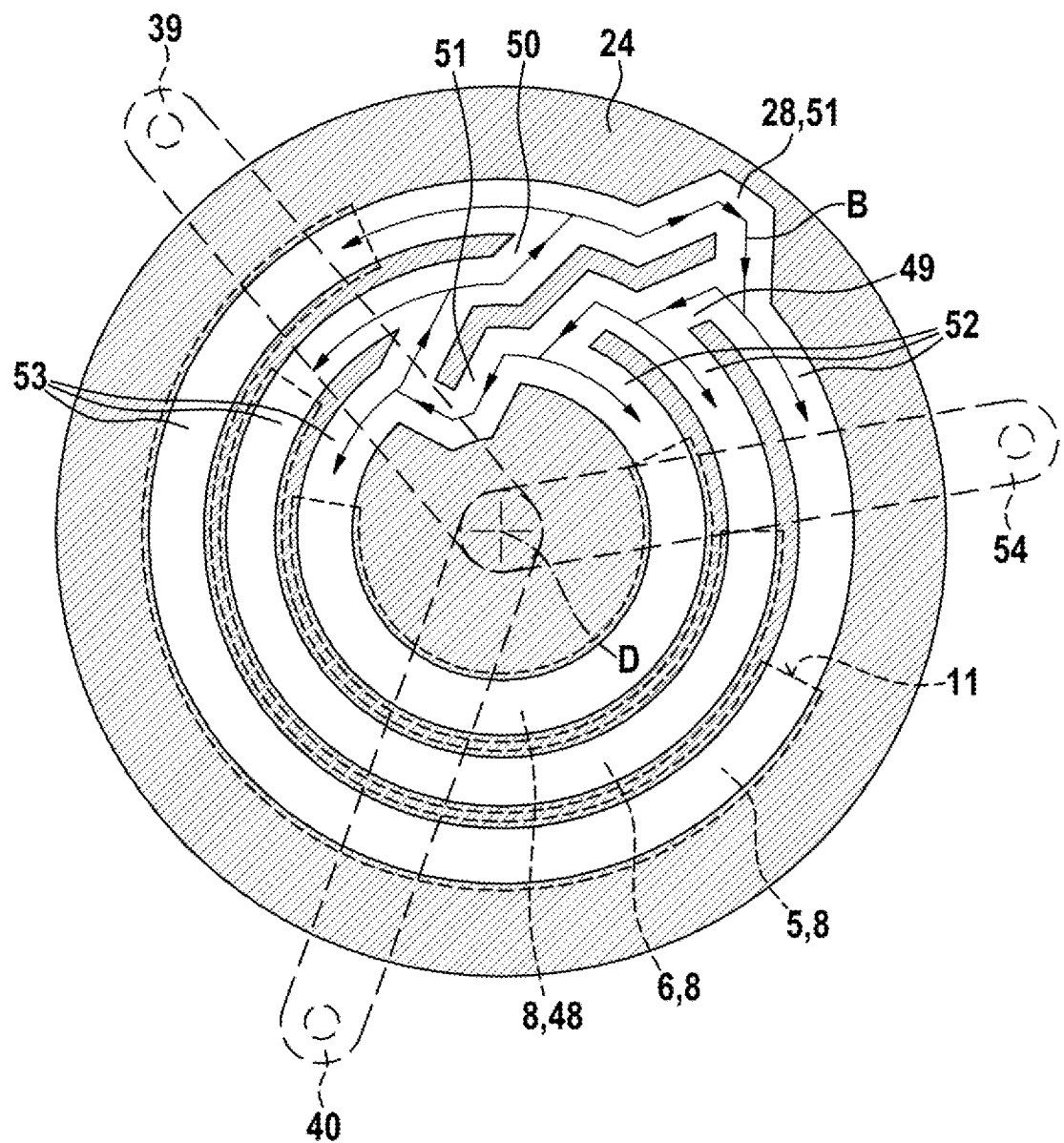
FIG. 4 shows the control element of a fourth exemplary embodiment in a top view.

The fourth exemplary embodiment primarily differs from the third exemplary embodiment in terms of the control gate 28 thereof. FIG. 4 thus primarily shows the control element 24, including the control gate 28 thereof, and, shown only with dotted lines, a first and a second driven element 5, 6 as well as a third driven element 48. Instead of a zig-zag section, from the corners of which the curved grooves alternately extend for the opposite adjustment directions, the control gate 28 of the fourth exemplary embodiment includes a first distribution section 49 and a second distribution section 50. The distribution sections 49, 50 extend in a step-like manner alternately radially and in the circumferential direction from the outside to the inside, or vice versa, and are arranged closely next to, adjoining, in parallel to one another. The respective ends of the distribution sections 49, 50 are connected by arc-shaped connecting sections 51, so that the sliding block (not shown here) can pass through the two distribution sections 49, 50 in a circle any arbitrary number of times. Circular arc-shaped adjustment sections 52, 53 extend in each case from the steps of the distribution sections 49, 50, namely three first adjustment sections 52 from the first distribution section 49, and three second adjustment sections 53 from the second distribution section 50. The first and second distribution sections 52, 53 transition in pairs into one another in an annular manner, wherein this is not mandatory for the function, but can facilitate the assembly of the control mechanism.

As in the third exemplary embodiment, a carrier element, which is not shown, including a sliding block element is arranged above the control element 24. "Above" here refers to the drawing plane. In the fourth exemplary embodiment, these elements can be designed the same as in the third exemplary embodiment, however the sliding block has a circular cross-section. The driven elements 5, 6, 48 can be arranged above the sliding block element without a cavity. The driven elements 5, 6, 48, in terms of the shape thereof, are essentially configured the same as the second driven element 6 of the third exemplary embodiment, however without the abutment elevations 9. The third driven element 48 accordingly also includes a lever, referred to as the "third lever 54" here. Similarly to the second driven element 6 of the second exemplary embodiment, the radially arranged end faces of the base body 8 of the driven elements 5, 6, 48, which extends in the shape of an open, flat 210° partial circular ring, serve as abutment surfaces 11. The driven elements 5, 6, 48 can each be rotated approximately 45 degrees in both directions compared to the illustrated neutral position, without a collision occurring between the base body 8 and the lever 39, 40, 54 in the region of the particular connection.

Possible movements of the sliding block inside the control gate 28 are shown by movement arrows B. The distribution sections 49, 50 and the adjustment sections 52, 53 are configured so that the distribution sections 49, 50 are always passed through clockwise. "Clockwise" here always refers to the view shown in FIG. 4. When the first distribution section 49 is passed through, which occurs counterclockwise, the sliding block can be directed into one of the three first adjustment sections 52 by a reversal of the direction, so as to adjust one of the three driven elements 5, 6, 48 clockwise there. The counterclockwise adjustment of the three driven elements 5, 6, 48 takes place with the respective reverse direction of rotation starting from the second distribution section 50. Since the movement of the sliding block is approximately limited to the paths denoted by movement arrows B, annular transition of the adjustment sections 52, 53 is not necessary, as described. Since additionally no spiral section is present, which extends around the axis of rotation D, a cavity between the sliding block element and the driven elements 5, 6, 48 can be dispensed with, as mentioned.

In all four exemplary embodiments, the control gate 28 is designed as a two-dimensional control gate which, within the meaning of the invention, means that the sliding block 15 is in each case only guided in two dimensions, which is to say corresponding to the two degrees of freedom F1, F2.

LIST OF REFERENCE NUMERALS

Control Mechanism for a Kinematic System in a Passenger Compartment
1 control mechanism
2 base body
3 deeper groove
4 flatter groove
5 first driven element
6 second driven element
7 carriage
8 base body of a driven element 5, 6, 48
9 abutment elevation
10 upper side of the base body 2
11 abutment surface of a driven element 5, 6
12 carriage base body
13 guide groove
14 sliding block element
15 sliding block
16 first spring element
17 torsion spring
18 abutment point
19 longitudinal slot
20 second spring element
21 further groove
22 U-shaped recess of the carriage base body 12
23 borehole
24 control element
24 bearing tenon
26 drive
27 reinforcement rib
28 control gate
29 slot
30 meander section
31 spiral section
32 entrainment surface
33 carrier wheel
34 pocket
35 guide body
36 elongated hole
37 elevation
38 recess
39 first lever
40 second lever
41 zig-zag section
42 curved groove
43 teeth
44 longitudinal breakthrough
45 arm
46 bearing hole
47 cavity
48 third driven element
49 first distribution section
50 second distribution section
51 connecting section
52 first adjustment section
53 second adjustment section
54 third lever
A1 first driving direction
A2 second driving direction
B movement arrow
D axis of rotation
D1 to D4 directions of rotation of the driven elements 5, 6
F1 first degree of freedom of the sliding block element 14
F2 second degree of freedom of the sliding block element 14
M central position of the sliding block element 14
S1 to S4 displacement directions of the driven elements 5, 6
R1 first direction
R2 second direction
R3 third direction

The invention claimed is:

1. A control mechanism for a kinematic system in a passenger compartment, for controlling movable elements of a ventilation nozzle, comprising:
   a base body;
   a control element comprising a control gate;
   a first driven element and a second driven element, the driven elements being movably mounted with respect to the base body;
   a sliding block element, which is mounted with a first and a second degree of freedom with respect to the base body and comprises a sliding block and an entrainment surface, the sliding block being guided by the control gate to cause the entrainment surface to consecutively abut the first and second driven elements by alternating movements of the sliding block in two opposite directions of the first degree of freedom relative to the control element; and a drive, by way of which the control element and/or the sliding block element is configured to be moved in two opposite driving directions with respect to the base body, so that the driven elements are configured to be adjusted by way of the sliding block element with respect to the base body, wherein the two opposite driving directions are directions of rotation.

2. The control mechanism according to claim 1, wherein the control element is configured to be moved in the two opposite driving directions with respect to the base body of the control mechanism, and the driven elements are mounted in a translatory manner with respect to the base body.

3. The control mechanism according to claim 1, wherein the sliding block element is urged by at least one first spring element to move in the two opposite directions.

4. The control mechanism according claim 1, wherein the sliding block element is rotatably mounted coaxially to the control element, whereby the first degree of freedom is provided.

5. The control mechanism according to claim 1, wherein the driven elements are rotatably mounted coaxially to the control element.

6. The control mechanism according to claim 1, wherein the control element is rigidly connected to or integral with the base body.

7. The control mechanism according to claim 1, wherein the control gate comprises a spiral section.

8. The control mechanism according to claim 1, wherein the control gate comprises a zig-zag section.

9. The control mechanism according to claim 1, wherein the sliding block element is exclusively moved by the control gate with respect to the second degree of freedom.

10. The control mechanism according to claim 1, wherein the control gate comprises a first distribution section, from which a respective first circular arc-shaped adjustment section branches off for each of the first and second driven elements by moving the sliding block in a first direction of the two opposite directions, and a separate second distribution section, from which a respective second circular arc-shaped adjustment section branches off for each of the first and second driven elements by moving the sliding block in a second direction of the two opposite directions.

11. The control mechanism according to claim 10, wherein the first and second distribution sections extend substantially parallel to one another, and adjoin one another by connecting the first distribution section to the second distribution section.

12. The control mechanism according to claim 1, wherein the entrainment surface is separate from the sliding block.

13. The control mechanism according to claim 12, wherein the sliding block element comprises a base body, from which the sliding block projects on a first side, and from which an elevation including the entrainment surface projects on an opposite second side.

14. The control mechanism according to claim 12, wherein a cavity is arranged between the sliding block element and the driven elements, into which the entrainment surface of the sliding block element and abutment surfaces of the driven elements protrude.

15. The control mechanism according to claim 1, wherein the control gate comprises a two-dimensional radial cam.

16. The control mechanism according to claim 1, wherein the drive is electromotive.

* * * * *